(12) United States Patent
Enya et al.

(10) Patent No.: US 6,562,746 B2
(45) Date of Patent: May 13, 2003

(54) CUBIC BORON NITRIDE-BASED SINTERED MATERIAL AND MANUFACTURE THEREOF

(75) Inventors: Yasuhiro Enya, Aichi-ken (JP); Shoichi Kume, Aichi-ken (JP); Yoshinori Nishida, Aichi-ken (JP); Tatsuya Hara, Kanagawa-ken (JP)

(73) Assignees: Aisin Seiki Kabushiki Kaisha, Kariya (JP); National Institute of Advanced Industrial Science and Technology, Tokyo (JP); Tomei Diamong Co., Ltd., Oyama (JP)

( * ) Notice: Subject to any disclaimer, the term of this patent is extended or adjusted under 35 U.S.C. 154(b) by 145 days.

(21) Appl. No.: 09/767,890

(22) Filed: Jan. 24, 2001

(65) Prior Publication Data

US 2001/0036893 A1 Nov. 1, 2001

(30) Foreign Application Priority Data

Jan. 25, 2000 (JP) .......................................... 2000-015355

(51) Int. Cl.⁷ .......................................... C04B 35/5835
(52) U.S. Cl. ........................ 501/96.4; 501/92; 501/97.1; 501/97.4; 501/96.1
(58) Field of Search .......................... 501/92, 96.4, 97.1, 501/97.4, 96.1

(56) References Cited

U.S. PATENT DOCUMENTS

| | | | |
|---|---|---|---|
| 5,288,297 A | * | 2/1994 | Ringwood .................. 51/293 |
| 5,948,716 A | | 9/1999 | Kume et al. ................ 501/96.4 |
| 5,981,416 A | | 11/1999 | Kume et al. ................ 501/96.1 |
| 6,140,262 A | * | 10/2000 | Collier et al. .............. 501/96.4 |

FOREIGN PATENT DOCUMENTS

| | | |
|---|---|---|
| JP | 58-060678 | 4/1983 |
| JP | 58-190874 | 11/1983 |
| JP | 61-197469 | 9/1986 |
| JP | 8-016028 | 2/1996 |
| JP | 10-182234 | 7/1998 |

* cited by examiner

Primary Examiner—Karl Group
(74) Attorney, Agent, or Firm—Oblon, Spivak, McClelland, Maier & Neustadt, P.C.

(57) ABSTRACT

The present invention provides a cubic boron nitride-based sintered material excellent in durability and usable for a cutting tool material capable of carrying out high speed cutting of at least a high grade cast iron represented with a Ni-Resist cast iron and an austempered cast iron and having a long life. The present invention further provides a method for manufacturing the cubic boron nitride-based sintered material. The method for the production of a cubic boron nitride-based sintered material includes preparing a starting mixture by mixing particles of cubic boron nitride with a binding powders based on the system of TiCN, $Si_3N_4$, $Al_2O_3$, and $Cr_xN$, wherein x varyies from 1 to 2.7; and subjecting the starting mixture to a sintering process under pressure and at the same time at a high temperature; and recovering a sintered product.

9 Claims, 8 Drawing Sheets

CUBIC BORON NITRIDE-BASED SINTERED MATERIAL AND MANUFACTURE THEREOF

CROSS-REFERENCES TO RELATED APPLICATIONS

The present application claims priority under 35 U.S.C. §119 to Japanese Patent Application No. 2000-015355, filed on Jan. 25, 2000, entitled "Cubic boron nitride-based sintered material and manufacture thereof".

The contents of this application are incorporated herein by reference by their entirety.

BACKGROUND OF THE INVENTION

1. Field of the Invention

The present invention relates to a cubic boron nitride-based sintered material efficiently usable at least as tool materials for such as high speed cutting tools for high grade cast iron represented with Ni-Resist cast iron and austempered cast iron and also relates to a method for manufacturing thereof.

2. Discussion of the Background

A Ni-Resist cast iron is a nickel-chromium-copper type austenite cast iron comprising austenite matrix and graphite existing in the matrix and has a chemical composition containing Ni in a range of 13.5–17.5%, Cu in a range of 5.5–7.5%, Cr in a range of 1.0–2.5%, 3.0%or more of C, Si in a range of 1.0–2.8%, and Mn in a range of 0.5–1.5%. Being excellent in wear resistance, heat resistance, and corrosion resistance as compared with a common cast iron, the Ni-Resist cast iron has been widely used as a material for a machine part required to have high temperature strength and hardness in corrosive atmosphere. Especially, the Ni-Resist cast iron has recently been used much mainly as essential and important parts composing an automobile because of further heightened power of an automobile.

In order to process a high grade cast iron represented with this Ni-resist cast iron and an austempered cast iron into a final shape and size of the essential and important parts or the like, cutting process is generally required after casting. A cutting processing tool for the high grade cast iron has to be capable of quickly carrying out processing with a required processing precision without vain. In the case where the edge of a tool is worn or broken owing to chipping, surface roughening and flush occur in the processed surface of the high grade cast iron. Therefore the required size precision and surface roughness cannot be achieved to result in inferior quality and impossibility of output of the cast iron as a product.

Hence, in the case where the tool is worn out or gets defectiveness as mentioned above, the tool has to be replaced immediately. Since the tool replacement leads to productivity decrease, it has to be avoided as much as possible.

Consequently, in order to carry out cutting processing at high efficiency for a high grade cast iron represented with a Ni-Resist cast iron and an austempered cast iron, it has been highly expected to obtain a cutting processing tool which is free of the wear and breaking of the edge thereof by chipping and has a long life.

As a cutting processing tool capable of solving the inconvenience, for example, a ceramic sintered body containing TiC, $Al_2O_3$, and a SiC whisker has been proposed as described in Japanese Patent Laid Number 8-16028.

Further, as described in Japanese Patent Laid Number 64-4986, a cubic boron nitride-based sintered material containing either or both of $Si_3N_4$ and $Al_2O_3$, and $Ti_2AlN$ as a binder has been proposed as a cutting and processing tool for a cast iron. Also as described in Japanese Patent Laid Number 64-4987, a cubic boron nitride-based sintered material containing $Si_3N_4$, $Si_2W$ and $Ti_2AlN$ as a binder has been proposed.

Some of the inventors of the present invention have also proposed before, as a cutting processing tool material suitably usable for a high grade cast iron, a cubic boron nitride-based sintered material characterized by sintering a powder of $Ti_{(1-x)}AlN_x$ (x varying from 0.05 to 0.70) and a cubic boron nitride powder, and the method for manufacturing the material.

However, the cutting processing tool materials of related arts have the following problems. That is, the ceramic sintered body containing TiC, $Al_2O_3$, and a SiC whisker has an advantageous point that it can be manufactured at low cost since no cubic boron nitride is contained, but the ceramic sintered body cannot provide durability which is enough to prolong the life to a desired level.

On the other hand, the cubic boron nitride-based sintered material is supposed to have excellent properties to a general iron cast as compared with the above described ceramic sintered body containing a SiC whisker. However, the conventional cubic boron nitride-based sintered material has not yet provided satisfactory durability to a high grade cast iron.

Further, the cubic boron nitride-based sintered material produced by sintering a powder of $Ti_{(1-x)}AlN_x$ (x varying from 0.05 to 0.70) and a cubic boron nitride powder has excellent properties to a spheroidal graphite cast iron, which belongs to the high grade cast iron and is hard to be processed as compared with a general cast iron, but it has not yet provided satisfactory durability to a high grade cast iron represented with a Ni-Resist cast iron and an austempered cast iron.

That is, a high grade cast iron such as a Ni-Resist cast iron and an austempered cast iron is excellent in wear resistance as compared with a spheroidal graphite cast iron and a general cast iron, and the hardness of the structure itself is further heightened during the cutting since the austenitic structure is transformed to a martensitic structure owing to the stress induction by processing stress at the time of cutting. Hence, even in the case where a foregoing conventional cubic boron nitride-based sintered material is used as a cutting tool, the tool does not provide durability which is enough to prolong the life to a desired level.

Consequently, it has been strongly required to develop an economical cutting tool which is capable of cutting a high grade cast iron represented with a Ni-Resist cast iron and an austempered cast iron at a high speed and has a long life.

SUMMARY OF THE INVENTION

While the conventional problems is taken into consideration, the present invention is developed to provide a cubic boron nitride-based sintered material with excellent durability usable for a cutting tool material which is capable of cutting at least a high grade cast iron represented with a Ni-Resist cast iron and an austempered cast iron at a high speed and has a long life, and a method for manufacturing such a cubic boron nitride-based sintered material.

According to one aspect of the invention, a method for the production of a cubic boron nitride-based sintered material includes preparing a starting mixture by mixing particles of cubic boron nitride with a binding powders based on the system of TiCN, $Si_3N_4$, $Al_2O_3$, and $Cr_xN$ (x varying from 1 to 2.7); subjecting the starting mixture to a sintering process under pressure and at the same time at a high temperature; and recovering a sintered product.

According to another aspect of the invention, a method for the production of a cubic boron nitride-based sintered material includes coating particles of cubic boron nitride with a binding powder based on the system of TiCN, $Si_3N_4$, $Al_2O_3$, and $Cr_xN$ (x varying from 1 to 2.7) to form coated starting particles; subjecting the coated starting particles to a sintering process under pressure and at the same time at a high temperature; and recovering a sintered product.

According to another aspect of the invention, a method for the production of a cubic boron nitride-based sintered material includes coating particles of cubic boron nitride with a first binding powder based on the system of TiCN, $Si_3N_4$, $Al_2O_3$, and $Cr_xN$ (x varying from 1 to 2.7) to form coated starting particles; preparing a starting mixture by mixing the coated starting particles with a second binding powder based on the system of TiCN, $Si_3N_4$, $Al_2O_3$, and $Cr_xN$ (x varying from 1 to 2.7); subjecting the starting mixture to a sintering process under pressure and at the same time at a high temperature; and recovering a sintered product.

According to another aspect of the invention, a cubic boron nitride-based sintered material is provided by sintering particles of cubic boron nitride with a binding powder based on the system of TiCN, $Si_3N_4$, $Al_2O_3$, and $Cr_xN$ (x varying from 1 to 2.7), wherein the sintered material further comprising $TiO_y$ that is formed in situ by sintering in the adjacency with the particles of cubic boron nitride, with y varying from 1 to 2, and the binding powder and particles of cubic boron nitride, as composed to be sintered, comprising 30 to 95% of cubic boron nitride and 70 to 10% of the binding powders, with the concentration of each component of the system being within the range of 1 to 25% by percentage to the whole volume combined.

According to the other aspect of the invention, a cubic boron nitride-based sintered material is provided by sintering particles of cubic boron nitride with a binding powder based on the system of TiCN, $Si_3N_4$, $Al_2O_3$, and $Cr_xN$ (x varying from 1 to 2.7), wherein the sintered material further comprising $TiO_y$ that is formed in situ by sintering in the adjacency with the particles of cubic boron nitride, with y varying from 1 to 2, and the binding powder and particles of cubic boron nitride, as composed to be sintered, comprising 30 to 95% of cubic boron nitride and 70 to 10% of the binding powders, with the concentration of each component of the system being within the range of 1 to 25%, by percentage to the whole volume combined, with SiC admixed thereto in an amount of 1 to 20% relative to the whole volume.

BRIEF DESCRIPTION OF THE DRAWINGS

A more complete appreciation of the invention and many of the attendant advantages thereof will become readily apparent with reference to the following detailed description, particularly when considered in conjunction with the companying drawings, in which.

DESCRIPTION OF THE PREFERRED EMBODIMENTS

The preferred embodiments will now be described with reference to the accompanying drawings, wherein like reference numerals designate corresponding or identical elements throughout the various drawings.

In the case where a cubic boron nitride powder is sintered using a binding powder as a binder containing four types of powders of TiCN, $Si_3N_4$, $Al_2O_3$, and $Cr_xN$ (x varying from 1 to 2.7), the TiCN is produced by continuously forming solid solution of a cubic system TiN and a cubic system TiC and the ratio of N: c is optional within a range from (1:9) to (9:1). Further, in order to properly draw properties of both of TiN and TiC, the ratio is preferably within a range from (2:8) to (8:2).

Further, the particle diameter of the TiCN powder is preferably smaller than the particle diameter of a cubic boron nitride powder to be described later. In the case where the particle diameter of the TiCN powder exceeds 10 μm, produced substances such as TiO, which will be described later, cannot sufficiently be produced and in addition, though it depends on the sintering conditions, TiCN possibly remains after sintering. Moreover, in the case where the particle diameter of the TiCN powder exceeds 10 μm, even if reaction of all of TiCN is caused to produce the desired produced substances such as TiO, it occurs a problem that the produced substances are unevenly deposited and even distribution of the produced substances as a binder around the cubic boron nitride particle can hardly be expected.

Therefore, the particle diameter of the TiCN powder is preferably 5 μm or less and, more preferably 2 μm or less. Generally an ultra fine particle having the diameter of 0.1 μm or less is preferable, but in this case if it is necessary to consider the removal of the absorbed gas. Further, in the case where the particle diameter is made smaller by pulverization, it is necessary to take enough care to prevent contamination with impurities.

The $Si_3N_4$ has two types of crystal structure; α-type of hexagonal system and β-type of trigonal system. Basically, both crystal structure are usable and the α-type one easy to form a solid solution with oxygen is preferable.

The particle diameter of the $Si_3N_4$ is also preferably smaller than the particle diameter of a cubic boron nitride powder to be described later. In the same reason for the TiCN, the particle diameter of the $Si_3N_4$ is preferably not larger than 5 μm and more preferably not larger than 2 μm. Generally, an ultra fine particle having a particle diameter of 0.1 μm or less is desirable and in this case, attention has to be paid to removal of an adsorbed gas. Additionally, in the case where the particle diameter is made narrow by pulverization, special care has to be taken to prevent contamination with impurities.

The $Al_2O_3$ has many crystal structure systems. Though basically any crystal structure systems are allowable, a γ-type, which is a cubic system spinel type, to be transformed into α-type at 1000° C. or higher and an α-type, a trigonal system corundum type, stable at such a high temperature are preferable.

The particle diameter of the $Al_2O_3$ is preferably smaller than the particle diameter of the cubic boron nitride powder to be described later. Since it is easy to get a highly pure powder of particle diameter of 1 μm or less, it is preferable to use such a powder. Subsequently, incomplete reaction and uneven deposition, which had to be taken into consideration in the case of TiCN and $Si_3N_4$, do not occur in this case. Nevertheless, in general, an ultrafine particle of 0.1 μm or smaller particle diameter is desirable and in this case, attention has to be paid to removal of an adsorbed gas.

The $Cr_xN$ (x varying from 1 to 2.7) mainly comprises CrN and $Cr_2N$ and both are non-stoichiometric compounds.

The particle diameter of the $Cr_xN$ (x varying from 1 to 2.7) is preferably smaller than the particle diameter of the cubic boron nitride powder to be described later. In the same reason for the TiCN and the likes, the particle diameter of the $Cr_xN$ (x varying from 1 to 2.7) is preferably not larger than 5 μm and more preferably not larger than 2 μm. Generally, an ultra fine particle having particle diameter of 0.1 μm or less is desirable and in this case, attention has to be paid to removal of an adsorbed gas. Additionally, in the case where the particle diameter is made narrow by pulverization, special care has to be taken to prevent contamination with impurities.

Next, the cubic boron nitride (hereafter sometimes referred to as cBN) is a boron nitride (BN) with a cubic zincblended type structure synthesized in ultrahigh pressure and the hardness is next to that of a diamond. Sintering to bind directly cubic boron nitride particles to one another cannot be carried out unless the pressure and the temperature are ultra high. It is therefore essential that binders are distributed on the surface of the cubic boron nitride particles in order to bind the particles one another.

In the case where the weight is given to only wear resistance of an obtained sintered material, the particle diameter of the cubic boron nitride is preferably 0.5 to 10 μm, except the case where the wear resistance is especially required as described later. If the particle diameter is smaller than 0.5 μm, there is a problem that the TiCN, $Si_3N_4$, $Al_2O_3$, and $Cr_xN$ (x varying from 1 to 2.7) are hardly distributed on the circumference of the particle.

Further, in the case an obtained sintered material is employed for a cutting tool for a high grade cast iron represented with a Ni-resist cast iron and an austempered cast iron, the particle diameter is preferably 0.5 to 5 μm. In the case where the particle diameter is smaller than 0.5 μm, the same problem as described above occurs. On the other hand, in the case where the particle diameter exceeds 5 μm, there is a problem that the finishing processing for a tool becomes difficult and cracking is easy to be occured in intermittent cutting process, and therefore the particle size is preferably 0.5 to 3 μm and more preferably 0.5 to 2 μm.

However, in the case where the importance is given more to the wear resistance even though the impact resistance is decreased, for example, a cubic boron nitride with 5 μm to 20 μm can be added up to 60% by volume to the whole cubic boron nitride besides the cubic boron nitride with the above particle diameter.

Next, an ultrahigh pressure sintering method, for example, is employed for a method for sintering a mixed powder of a binding powder as a binder containing respective powders of the TiCN, $Si_3N_4$, $Al_2O_3$, and $Cr_xN$ (x varying from 1 to 2.7) and a powder of a cubic boron nitride. The ultrahigh pressure sintering method is carried out, for example, on conditions of 1,300 to 1,600° C. temperature and 4.0 to 7.0 GPa pressure.

In a method of manufacturing a cubic boron nitride-based sintered material of the present invention, a mixed powder of a binding powder as a binder containing respective powders of the TiCN, $Si_3N_4$, $Al_2O_3$, and $Cr_xN$ (x varying from 1 to 2.7) and a powder of a cubic boron nitride is sintered. A cubic boron nitride-based sintered material obtained consequently shows excellent durability in the case it is employed, for example, for a cutting tool.

Conventionally, even in the case where a sintered material contains a cubic boron nitride, it has not shown sufficient durability. The reason is supposedly attributed to the inferior heat resistance and durability of the binder itself.

On the contrary, in the present invention, as binders, the four types of powders of TiCN, $Si_3N_4$, $Al_2O_3$, and $Cr_xN$ (x varying from 1 to 2.7) are employed. Hence, in a cubic boron nitride-based sintered material after sintering, the crystal structures of TiCN, $Si_3N_4$, $Al_2O_3$, and $Cr_xN$ (x varying from 1 to 2.7), powders for a binder, are transformed, and it is confirmed that at least a crystal structure of $TiO_y$ (y varying from 1 to 2) exists and besides that, it is supposed that some unknown binders having some unknown diffraction peaks are produced. Owing to these produced substances, the binder itself is provided with extremely high hardness and excellent oxidation resistance.

A cubic boron nitride-based sintered material obtained in the present invention is composed of highly hard cubic boron nitride particles firmly bonded to one another by the binder excellent in durability. The obtained cubic boron nitride-based sintered material can, therefore be used effectively for, for example, a cutting tool and a bit for drilling owing to the excellent durability of the binder as well as the properties of the cubic boron nitride. For example, in the case of using the sintered material for a cutting tool for a high grade cast iron represented with a Ni-resist cast iron and an austempered cast iron, the sintered material can provide a cutting tool which is capable of carrying out high speed cutting and heavy load cutting, prevents elimination of cubic boron nitride particles, and is excellent in wear resistance and defect resistance.

Next, the starting mixture preferably comprises, by percentage to the whole volume combined, 30 to 90% cubic boron nitride and 70 to 10% of the binding powder, with each component of the system being within the range of 1 to 25%.

In the case where the total of a binding powder is less than 10%, the ratio of a cubic boron nitride exceeds 90% by volume and subsequently, the binder produced from a binding powder cannot sufficiently be distributed around the cubic boron nitride particles. As a result, there is a problem that the bonds of the cubic boron nitride particles are significantly weak and moreover voids remains among the cubic boron nitride particles, with the result that it is impossible to use the sintered material for a cutting tool.

On the other hand, in the case where the total of a binding powder exceeds 70% by volume, subsequently, the content ratio of the cubic boron nitride is suppressed to less than 30% by volume. In this case, the excellent properties such as high hardness of a cubic boron nitride cannot fully be utilized. Consequently, the mixing ratio of the cubic boron nitride is further preferably 40 to 80% by volume.

Also, the mixing ratio of each powder composing a binding powder is, as described above, preferably within a range of 1 to 25%.

That is, in the case where the sole mixing ratio of any one of the powders of TiCN, $Si_3N_4$, $Al_2O_3$, and $Cr_xN$ (x varying from 1 to 2.7) is less than 1%, the powder cannot work as a binder raw material for a cubic boron nitride-based sintered material of the present invention. On the other hand, in the case where each powder composing a binding powder exceeds 25%, each powder as a binder raw material cannot be well-balanced with other binder raw materials and a desired binder cannot be obtained. Consequently, the solely mixing ratio of each of TiCN, $Si_3N_4$, $Al_2O_3$, and $Cr_xN$ (x varying from 1 to 2.7) is preferably 1 to 25% by volume and more preferably 2 to 20% by volume.

Next, in the case where the coated particle is previously produced to be sintered, the distribution of the cubic boron nitride in the obtained cubic boron nitride-based sintered material can be more even because the coated particle is previously produced and powders as a binder are around the cubic boron nitride particles and these particles are gathered together and sintered.

In this case, produced substances containing at least $TiO_y$ (y varying from 1 to 2) as a binder can be derived from a binding powder and consequently, and a sintered material has a fine structure in which firmly bonded cubic boron nitride particles are evenly dispersed.

The mixing ratios of respective raw materials and the reasons for the restriction for the respective raw materials are approximately same as described above and only the lower limit value of each powder as a binder can be lowered to 5%.

That is, even in the case where the total amount of the powders as a binder is less than 10%, the binder can be distributed around the cubic boron nitride by previously producing the coated particles and the cubic boron nitride particles can firmly be bonded to one another. However, in the case where the total amount of the powders as a binder is less than 5%, as same as described above, voids remains among the cubic boron nitride particles to cause problems of deterioration of the toughness attributed to that the voids become breaking points and of a short life of a tool as a result. Consequently, the total mixing amount of the powders as a binder is preferably 15% or higher by volume.

On the other hand, in the case where the total mixing amount of the powders as a binder exceeds 90%, In addition to the above-described problems, there is a problem that the cost for the coating becomes high. Consequently, the total addition amount (the coating amount) of the powders as a binder is preferably up to 50% by volume.

In this case, a vapor phase coating method described in the producing method of a coated cubic boron nitride-based sintered material of, for example, Japanese Patent Publication Number 7-53268, can be employed for the method for producing the coated particles. Alternatively, vapor phase coating methods described in Japanese Patent Publication Number 61-30663 and Japanese Patent Publication Number 58-31076 may be employed.

Next, the coated particle coated with the first binding powder is previously produced and then a mixed powder produced by mixing the particle with a second binding powder as a binder is sintered. In this case, the manufacturing cost of the coated particle is suppressed in the case where a relatively large amount of a powder mixture of TiCN, $Si_3N_4$, $Al_2O_3$, and $Cr_xN$ (x varying from 1 to 2.7) is required to be added, at the same time the effect of using the coated particle can be obtained.

That is, for example, in the case where TiCN, $Si_3N_4$, $Al_2O_3$, and $Cr_xN$ (x varying from 1 to 2.7) are required to be added in 70% in total, the amount to be used for coating the cubic boron nitride is suppressed to, for example, 20% by volume and the remaining 50% by volume in total of TiCN, $Si_3N_4$, $Al_2O_3$, and $Cr_xN$ (x varying from 1 to 2.7) is added and mixed as powders.

Consequently, the manufacturing cost can be suppressed as compared with that in the case where the powder mixture of TiCN, $Si_3N_4$, $Al_2O_3$, and $Cr_xN$ (x varying from 1 to 2.7) is all consumed for coating the cubic boron nitride particle and at the same time the effect of using the coated particle can be obtained.

In this case, produced substances containing at least $TiO_y$ (y varying from 1 to 2) can be derived as a binder from the first binding powder and a second binding powder as a binder and consequently, a sintered material obtained has a fine structure in which firmly bonded cubic boron nitride particles are evenly dispersed.

Next, the starting mixture further is preferably admixed with 1 to 20% SiC by volume to the particles of cubic boron nitride and binding powder all combined.

The SiC includes the α-type of a rhombic system wurizite type structure and the β-type of a cubic system zincblended structure. Both are allowable to be used and the α-type one which is more flexible and is preferable. By adding SiC, produced substances containing at least $TiO_y$ (y varying from 1 to 2) heightens the hardness after sintering, so that SiC addition is effective to improve the wear resistance of a cubic boron nitride-based sintered material.

In the case where the SiC amount by extra addition is less than 1% by volume, there is little effect on the heightening the hardness. On the other hand, in the case of exceeding 20%, the balance of the powder mixing is lost and since the content of a cubic boron nitride is especially decreased, it occurs an undesirable problem that the wear resistance is, on the contrary, decreased. The additional amount by extra is preferably 3 to 15% by volume.

The particle diameter of the SiC is preferably smaller than the particle diameter of the cubic boron nitride powder. In order to distribute SiC evenly around the cubic boron nitride particle as a reinforcing material in binders while being dispersed in TiO to be produced, the particle diameter is preferably 3 μm or less and more preferably 2 μm or less. Generally, an ultra fine particle having particle diameter of 0.1 μm or less is desirable and in this case, attention has to be paid to removal of an adsorbed gas. Additionally, in the case where the particle diameter is made narrow by pulverization, special care has to be taken to prevent contamination with impurities.

Those cubic boron nitride-based sintered materials are all advantageously usable for, for example, a cutting tool and a bit for drilling since, as described above, not only the cubic boron nitride but also the binders show excellent durability. In the case of using the sintered materials for a cutting tool for a high grade cast iron represented with, for example, a Ni-Resist cast iron and an austempered cast iron, the cutting tool produced from the materials is capable of carrying out high speed cutting and heavy load cutting, preventive to parting of the cubic boron nitride particle and excellent in the wear resistance and cracking resistance.

Embodiments

A cubic boron nitride-based sintered material and a method for manufacturing the same relevant to embodiments of the present invention will be described according to FIGS. 1 to 10.

In this example, cubic boron nitride-based sintered materials of a variety of compositions were manufactured by three types of manufacturing methods. After that, the obtained materials were used as cutting tool materials to produce cutting tools and the properties in terms of the life of each cutting tool were evaluated.

Table 1 shows the manufacturing methods employed for manufactured cubic boron nitride-based sintered materials, the mixing amounts of the respective raw materials, the manufacturing conditions, evaluation results, which will be described later. The mixing amount of SiC is the ratio by the extra addition and those of others are the ratios by internal addition.

At first, the manufacture of cutting tool materials using cubic boron nitride-based sintered materials will be described. In this example, widely three types of methods were employed for the manufacture.

The first manufacturing method (the manufacturing method A in Table 1) was a method for sintering a mixed powder of a cubic boron nitride powder and a binding powder as a binder.

Figure 1:
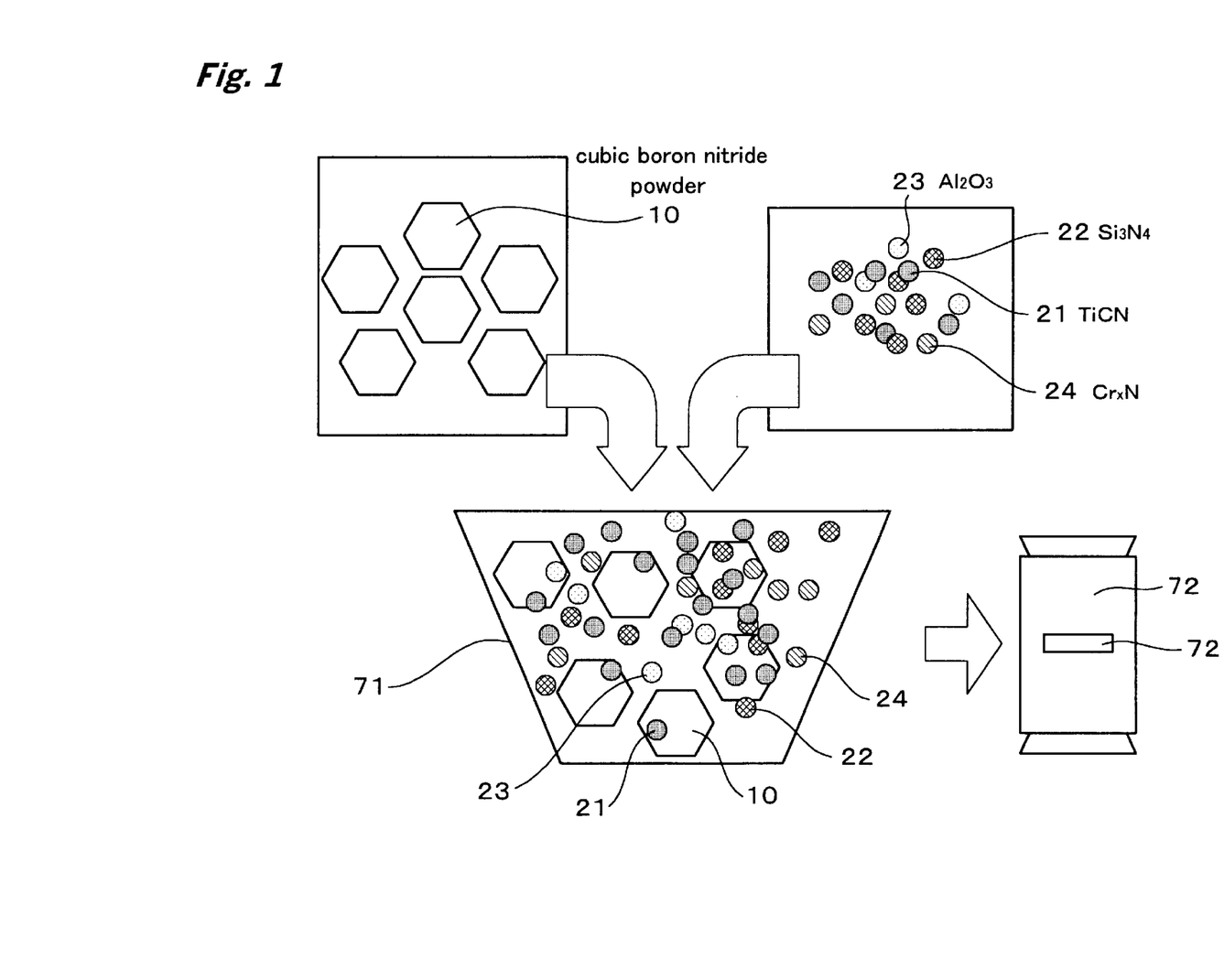
FIG. 1 is diagrammatic figures illustrating the first manufacturing method in Embodiments.

More practically, as shown in Table 1, a cubic boron nitride powder 10 with 2.0 μm average particle diameter, respective powders 21 to 24 of TiCN, $Si_3N_4$, $Al_2O_3$, and $Cr_xN$ (x varying from 1 to 2.7) with 2.0 μm average particle diameter as a binding powder as a binder, and a SiC powder with 2.0 μm average particle diameter (not illustrated) were made available. The respective powders 10, 21 to 24 and, based on the necessity, the SiC powder were mixed to give the compositions shown in Table 1 and the resultant mixtures were mixed for 1 hour in a planetary ball mill and then dried and press-molded by dies as illustrated in FIG. 1. The resultant molded products were laid on stands produced by molding a WC powder containing 10% by weight of a Co powder in the same manner as the above and put in specimen capsules 721 and the resulting products were held for 15 to 60 minutes at 1,300 to 1,550° C. temperature and in 4.0 to 6.5 GPa pressure in an ultra high pressure apparatus 72 and after that the products were cooled and the pressure was decreased to obtain cutting tool materials (Examples E1, 4, 7, 10, 16, 22 and Comparative example C1).

The second manufacturing method (the manufacturing method B in Table 1) was a method for producing a coated particle by coating a cubic boron nitride powder with a binding powder as a binder and then sintering the coated particle.

Figure 2:
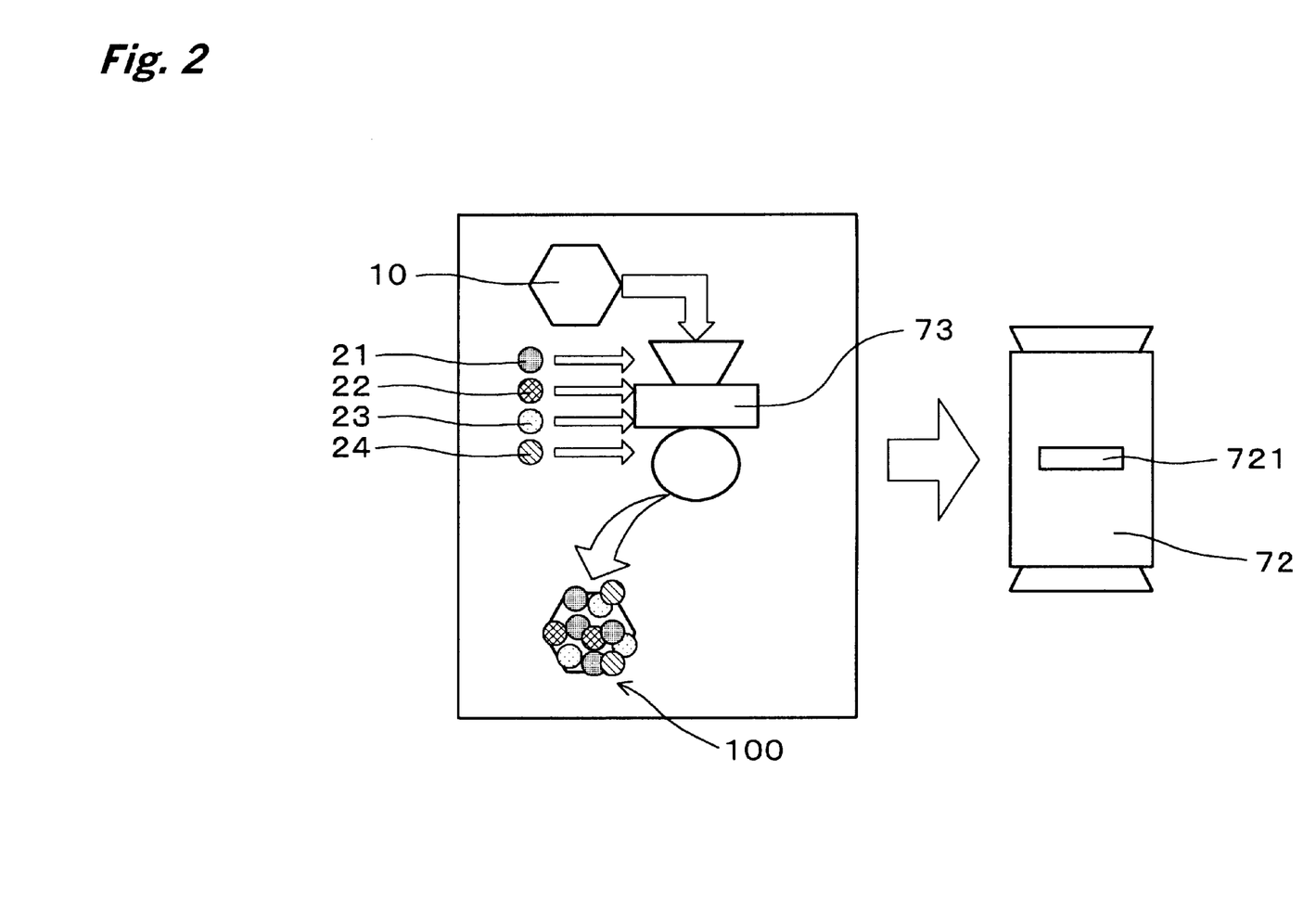
FIG. 2 is diagrammatic figures illustrating the second manufacturing method in Embodiments.

More practically, the same powders as described above were prepared. As illustrated in FIG. 2, these powders were inserted into a PVD apparatus 73 to form a coated particles 100 by coating the surface of the cubic boron nitride powders 10 with the respective powders 21 to 24 as a binding powder as a binder and, based on the necessity, also with the SiC powder. Next, the coated particles 100 were press-molded in the same manner as that in the first manufacturing method and then laid on the stands, held in the same conditions as the above in an ultra high pressure apparatus 72 and after that the resultant products were cooled and the pressure was decreased to obtain cutting tool materials (Examples E5, 8, 11, 13, 14, 19, 20).

The third manufacturing method (the manufacturing method C in Table 1) was a method comprising steps of coating the surface of a cubic boron nitride powder with at least a part of powder as a binder (a first binding powder as a binder) to produce a coated particle, producing a mixed powder of the coated particle and a second binding powder as a binder, and sintering the mixed powder.

Figure 3:
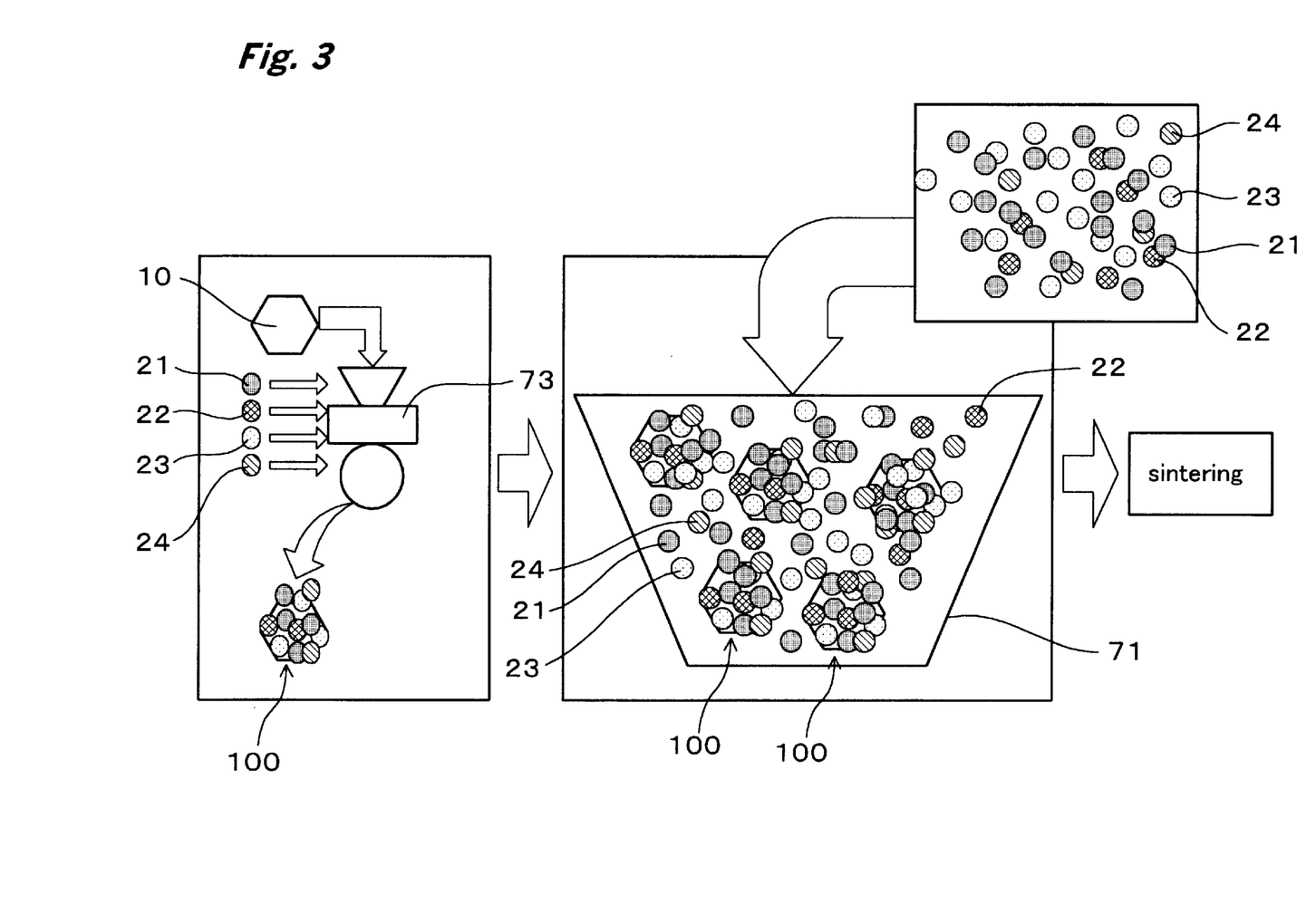
FIG. 3 is diagrammatic figures illustrating the third manufacturing method in Embodiments.

More practically, as illustrated in FIG. 3, the coated particles 100 were produced in the same manner as the second manufacturing method and then the coated particles 100 and the respective powders 21 to 24 as a binding powder were mixed for 1 hour by a planetary ball mill in the same manner as the first manufacturing method and then dried and press-molded by dies. In the same manner as described above, the resultant molded products were laid on the stand in the same conditions as described above in the ultra high pressure apparatus 72. After that, the resultant products were cooled and the pressure was decreased to obtain cutting tool materials (Examples E2, 3, 6, 9, 12, 15, 17, 18, 21, and Comparative example C2).

Figure 4:
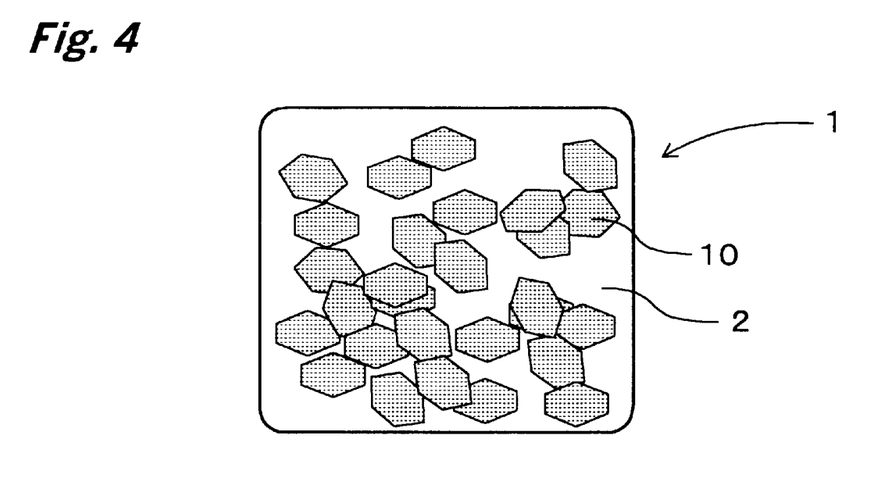
FIG. 4 is a schematic illustration showing the structure of the cubic boron nitride-based sintered material obtained by the first manufacturing method in Embodiments.
Figure 5:
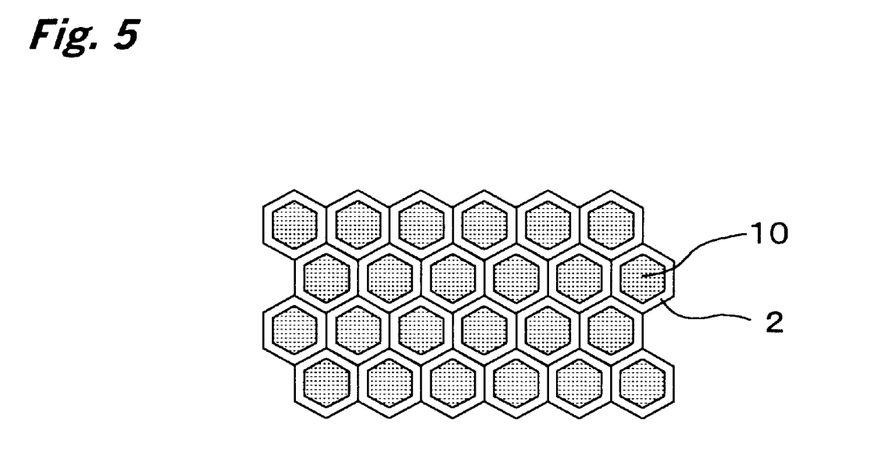
FIG. 5 is a schematic illustration showing the structure of the cubic boron nitride-based sintered material obtained by the second manufacturing method in Embodiments.
Figure 6:
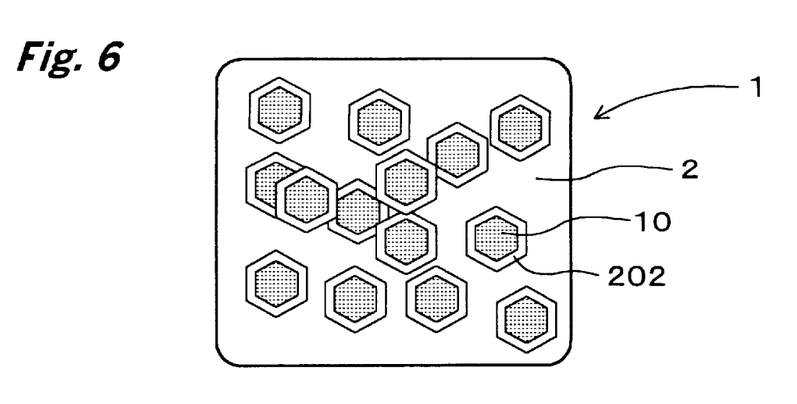
FIG. 6 is a schematic illustration showing the structure of the cubic boron nitride-based sintered material obtained by the third manufacturing method in Embodiments.
Figure 7:
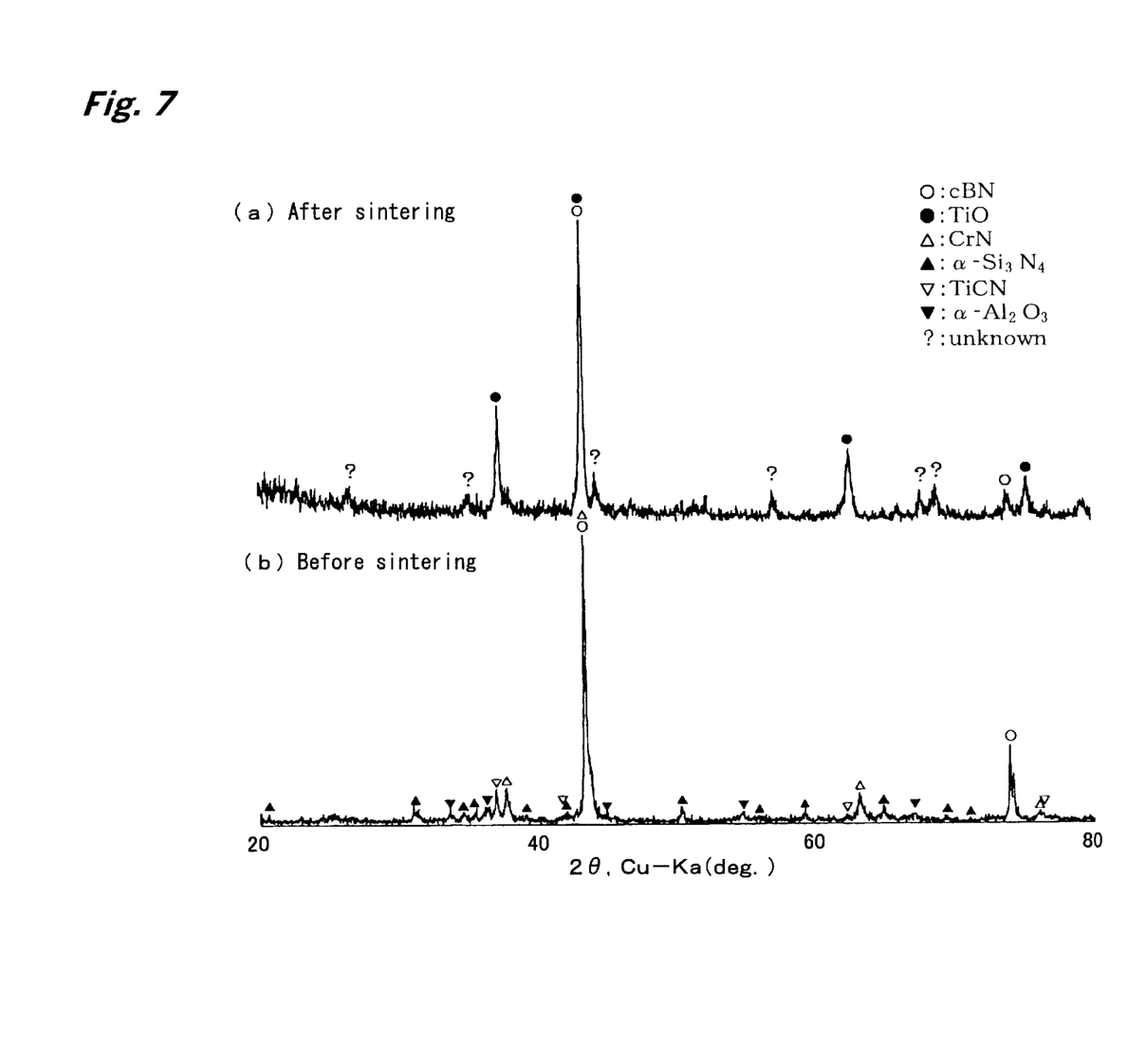
FIG. 7(a) is an illustration showing the peaks of x-ray diffraction after sintering in Embodiments.
FIG. 7(b) is an illustration showing the peaks of x-ray diffraction before sintering in Embodiments.

The schematic illustrations of structures of cubic boron nitride-based sintered materials obtained by the first to third manufacturing methods are illustrated in the FIGS. 4 to 6.

The cubic boron nitride-based sintered materials 1 obtained by the first manufacturing method have a structure, as shown in FIG. 4, comprising a matrix of the binder 2 and cubic boron nitride particles 10 dispersed in the matrix.

Further, the cubic boron nitride-based sintered materials 1 obtained by the second manufacturing method have a structure, as shown in FIG. 5, in which cubic boron nitride particles 10 coated with the binder 2 are significantly evenly dispersed.

Furthermore, the cubic boron nitride-based sintered materials 1 obtained by the third manufacturing method have a structure, as shown in FIG. 6, which is just like an intermediate state of the first and second manufacturing methods and comprises a matrix of the binder 2 and cubic boron nitride particles 10 coated with a second binder 202 with the same as or slightly different from the composition of the binder 2 and dispersed in the matrix.

Next, as representative peaks of a representative x-ray diffraction graph of cutting tool materials obtained in such manners, the results after sintering of the example E1 are illustrated in FIG. 7(a). Also, for comparison, the peaks of x-ray diffraction graph of the mixed powder before sintering of the example E1 are illustrated in FIG. 7(b).

As being understood from these figures, the crystal structures of TiCN, $Si_3N_4$, $Al_2O_3$, and $Cr_xN$ (x varying from 1 to 2.7) are changed after sintering and at least a crystal structure of $TiO_y$ (y varying from 1 to 2) is observed and besides that, unknown binders having 2 or 3 unknown diffraction peaks are produced and they supposedly firmly bind the cubic boron nitride particles.

Figure 8:
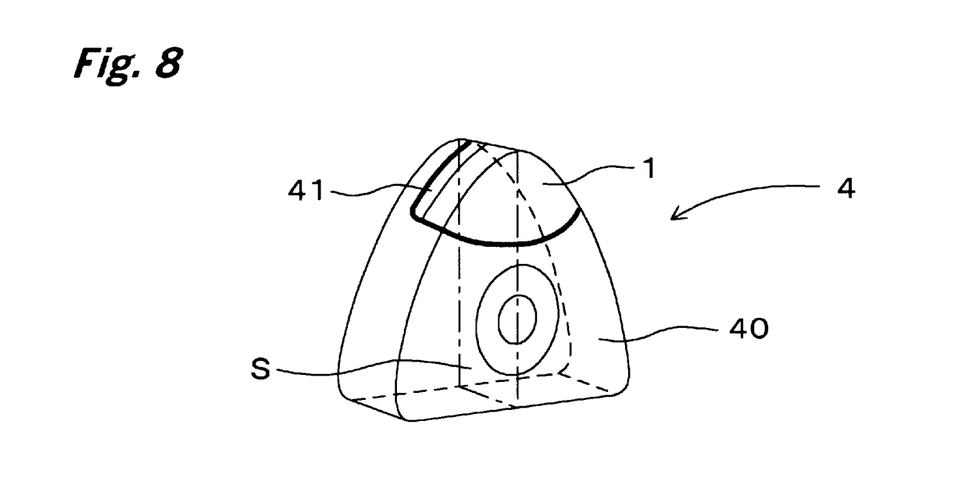
FIG. 8 is a perspective view of a cutting tool in Embodiments.
Figure 9:
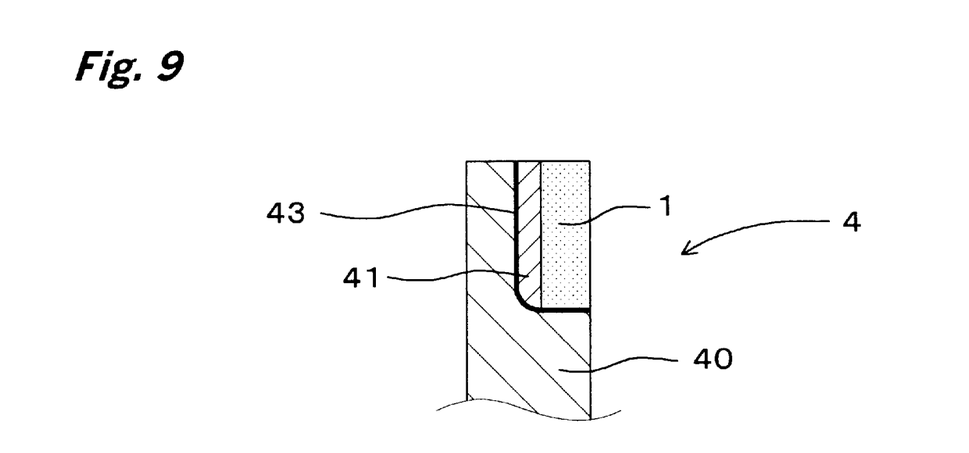
FIG. 9 is a cross-section in S cross-section of a cutting tool in FIG. 8 in Embodiments.
Figure 10:
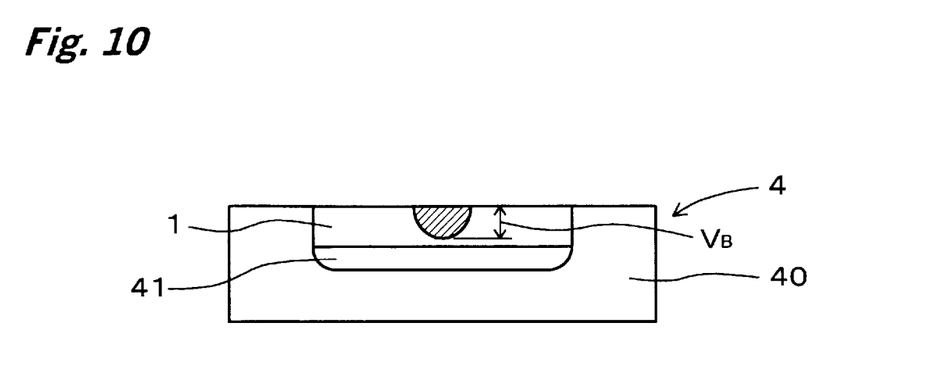
FIG. 10 is a plan view of a cutting tool showing the flank wear in Embodiments.

Next, as illustrate in FIGS. 8 to 10, the cutting tool materials obtained as described above were processed into cutting tools 4 with a shape defined as JIS: SPGN 120304 SN and employed for turning processing of an object material to be cut and the flank wear ($V_B$) were measured as the life evaluation standards. Each of the cutting tools 4, as illustrated in FIGS. 8 to 10, was produced by joining a cutting tool material, which was produced by layering a cubic boron nitride-based sintered material 1 on a stand 41, at the tip of a base material 40 with a solder 43.

The object material to be cut was a Ni-Resist cast iron (JIS: FCA-NiCuCr 1562; and hardness: Hv 163) of outer diameter φ110 mm.

The turning conditions were as follows: the cutting speed: 220 m/min, the sending rate: 0.3 mm/rev, the entering: 4.5 mm, and the cutting oil: Chemicool SR 1. The turning processing was carried out under the described conditions and the wear $V_B$ (FIG. 10) of the flanks 3 after cutting in 21 km cutting length was measured.

The results of the turning test are shown in Table 1.

For comparison, the same test was carried out for tools made of widely sold and conventionally employed cubic boron nitride-based sintered materials and the results were also shown together in Table 1.

As being understood from Table 1, the examples E1 to E22 of the products of the present invention were found to have excellent wear resistance clearly as compared with the comparative examples C1 to C4 and have significantly long lives. That is supposedly attributed to that binders are produced by transformation of the 4 types of powders 21 to 24 as a binding powder as a binder, in other words, unknown binders having at least a crystal structure of $TiO_y$ (y varying from 1 to 2) and besides, unknown binders having 2 or 3 unknown diffraction peaks are produced, and that the produced binders firmly bond the cubic boron nitride particles.

Consequently, it can be understood that a cubic boron nitride-based sintered material of the present invention is a significantly excellent cutting tool material. As a result, a cutting tool material which is capable of carrying out high speed cutting and heavy load cutting of a high grade cast iron represented with a Ni-Resist cast iron and an austempered cast iron and has a long life is thus developed just as expected for a long time, so that the productivity can greatly be improved.

A cutting tool material of the present invention can carry out process of a high grade cast iron represented with a Ni-Resist cast iron and an austempered cast iron, which are hardly processable among cast irons, at a high efficiency and on the other hand, it shows excellent properties when it is employed for a general cast iron (FC material) and a spheroidal graphite cast iron (FCD material) which are relatively easy to be processed.

TABLE 1

| specimen number | method of manufacturing | cBN | $Si_3N_4$ coating | $Si_3N_4$ powder | TiCN coating | TiCN powder | $Al_2O_3$ coating | $Al_2O_3$ powder | $Cr_xN$ coating | $Cr_xN$ powder | SiC powder | pressure (GPa) | temperature (°C.) | time (minute(s)) | amount of wear $V_B$ (mm) |
|---|---|---|---|---|---|---|---|---|---|---|---|---|---|---|---|
| examples (E) | | | | | | | | | | | | | | | |
| 1 | A | 40 | — | 7.5 | — | 20 | — | 18.8 | — | 13.8 | — | 4.5 | 1300 | 20 | 0.172 |
| 2 | C | ↑ | — | 10 | 5 | 10 | 6 | 10.8 | — | 13.8 | — | 4.0 | 1300 | 25 | 0.168 |
| 3 | C | ↑ | — | 15 | 3 | 10 | 3 | 10.8 | 3 | 10.8 | 4.5 | 4.0 | 1350 | 35 | 0.162 |
| 4 | A | 50 | — | 10 | — | 8 | — | 13.8 | — | 13.8 | 4.5 | 4.8 | 1450 | 40 | 0.160 |
| 5 | B | ↑ | 9 | — | 12.5 | — | 14 | — | 13.5 | — | 1 | 5.3 | 1390 | 45 | 0.155 |
| 6 | C | ↑ | — | 5 | — | 10 | 5 | 10 | — | 10 | 10 | 5.0 | 1400 | 45 | 0.158 |
| 7 | A | 60 | — | 5 | — | 9 | — | 13 | — | 8 | 5 | 5.3 | 1500 | 45 | 0.156 |
| 8 | B | ↑ | 8 | — | 10 | — | 13 | — | 8 | — | 1 | 5.1 | 1550 | 40 | 0.138 |
| 9 | C | ↑ | 4 | 4 | 5 | 5 | 6 | 7 | 4 | 4 | — | 5.3 | 1500 | 40 | 0.147 |
| 10 | A | 70 | — | 6 | — | 6.5 | — | 8.25 | — | 8.25 | 1 | 5.5 | 1500 | 30 | 0.135 |
| 11 | B | ↑ | 6 | — | 6.5 | — | 8.25 | — | 8.25 | — | 2.5 | 5.0 | 1500 | 30 | 0.125 |
| 12 | C | ↑ | — | 5 | 3 | 4.5 | 3 | 4.5 | — | 6 | 2 | 5.0 | 1500 | 20 | 0.130 |
| 13 | B | 80 | 2 | — | 6 | — | 4 | — | 4 | — | 4 | 6.0 | 1450 | 60 | 0.120 |
| 14 | B | ↑ | 4 | — | 6 | — | 6 | — | 3 | — | 1 | 6.5 | 1500 | 60 | 0.120 |
| 15 | C | ↑ | — | 2 | 3 | 3 | 4 | — | — | 4 | 4 | 6.0 | 1400 | 45 | 0.130 |
| 16 | A | 30 | — | 15 | — | 20 | — | 30 | — | 5 | 10 | 4.0 | 1400 | 60 | 0.195 |
| 17 | C | ↑ | 10 | — | 5 | 20 | — | 25 | — | 5 | 5 | 4.0 | 1400 | 90 | 0.185 |
| 18 | C | ↑ | — | 10 | 10 | 20 | 5 | 15 | — | 5 | 5 | 4.0 | 1450 | 90 | 0.180 |
| 19 | B | 90 | 1 | — | 2 | — | 3 | — | 3 | — | 1 | 5.5 | 1400 | 40 | 0.140 |
| 20 | B | ↑ | 2 | — | 2 | — | 3 | — | 3 | — | — | 5.5 | 1500 | 40 | 0.141 |
| 21 | C | ↑ | — | 1 | — | 3 | 1 | — | 5 | — | — | 5.5 | 1500 | 60 | 0.141 |
| 22 | A | 20 | — | 20 | — | 25 | — | 25 | — | 20 | — | 3.5 | 1300 | 90 | 0.385 |
| comparative examples (C) | | | | | | | | | | | | | | | |
| 1 | A | 95 | — | — | — | 2 | — | 3 | — | — | — | 5.5 | 1500 | 30 | broken |
| 2 | C | 80 | 5 | — | 5 | — | 10 | — | — | — | — | 5.0 | 1400 | 30 | broken |
| 3 | sold | 80 | | | | (WC—Co) 20 | | | | | | — | — | — | broken |
| 4 | sold | 60 | | | | ($Al_2O_3$, TiC) 40 | | | | | | — | — | — | broken |

Obviously, numerous modifications and variations of the present invention are possible in light of the above teachings. It is therefore to be understood that, within the scope of the appended claims, the invention may be practiced otherwise than as specifically described here.

What is claimed is:

1. A method for the production of a cubic boron nitride-based sintered material, comprising:
   preparing a starting mixture by mixing particles of cubic boron nitride with a binding powder comprising TiCN, $Si_3N_4$, $Al_2O_3$, and $Cr_xN$ wherein x varies from 1 to 2.7;
   subjecting said starting mixture to a sintering process under pressure and at the same time at a temperature; and recovering a sintered product.

2. The method for the production of a cubic boron nitride-based sintered material according to claim 1, wherein said starting mixture comprises from 30 to 90% cubic boron nitride and from 70 to 10% of said binding powder, with each component of said binding powder being within the range of from 1 to 25% by volume based on the total volume of the binding powder and the cubic boron nitride.

3. The method for the production of a cubic boron nitride-based sintered material according to claim 1, further comprising supplementing said starting mixture with from 1 to 20% SiC by volume based on the total volume of cubic boron nitride and binding powder.

4. A method for the production of a cubic boron nitride-based sintered material, comprising:

coating particles of cubic boron nitride with a binding powder comprising TiCN, $Si_3N_4$, $Al_2O_3$, and $Cr_xN$, wherein x varies from 1 to 2.7, to form coated starting particles;

subjecting said coated starting particles to a sintering process under pressure and at the same time at a temperature; and recovering a sintered product.

5. The method for the production of a cubic boron nitride-based sintered material according to claim 4, further comprising supplementing said coated staffing particles with from 1 to 20% SiC by volume based on the total volume of cubic boron nitride and binding powder.

6. A method for the production of a cubic boron nitride-based sintered material, comprising:

coating particles of cubic boron nitride with a first binding powder based on the system of TiCN, $Si_3N_4$, $Al_2O_3$, and $Cr_xN$, wherein x varies from 1 to 2.7, to form coated starting particles;

preparing a starting mixture by mixing said coated starting particles with a second binding powder comprising TiCN, $Si_3N_4$, $Al_2O_3$, and $Cr_xN$, wherein x varies from 1 to 2.7;

subjecting said starting mixture to a sintering process under pressure and at the same time at a temperature; and recovering a sintered product.

7. The method for the production of a cubic boron nitride-based sintered material according to claim 6, further comprising supplementing said starting mixture with from 1 to 20% SiC by volume based on the total volume of cubic boron nitride and binding powder.

8. A cubic boron nitride-based sintered material, provided by sintering particles of cubic boron nitride with a binding powder comprising TiCN, $Si_3N_4$, $Al_2O_3$, and $Cr_xN$, wherein x varies from 1 to 2.7, wherein said sintered material further comprises TiOy that is formed in situ by sintering in the adjacency with said particles of cubic boron nitride, wherein y varies from 1 to 2, and said binding powder and particles of cubic boron nitride, as composed to be sintered, comprises from 30 to 95% of cubic boron nitride and from 70 to 10% of said binding powders, with the concentration of each component of said binding powder being from 1 to 25% based on the total volume of the binding powder and the cubic boron nitride.

9. A cubic boron nitride-based sintered material, provided by sintering particles of cubic boron nitride with a binding powder comprising TiCN, $Si_3N_g$, $Al_2O_3$, and $Cr_xN$, wherein x varies from 1 to 2.7, wherein said sintered material further comprises TiOy that is formed in situ by sintering in the adjacency with said particles of cubic boron nitride, wherein y varies from 1 to 2, and said binding powder and particles of cubic boron nitride, as composed to be sintered, comprises from 30 to 95% of cubic boron nitride and from 70 to 10% of said binding powders, with the concentration of each component of said binding powder being within the range of from 1 to 25% based on the total volume of the binding powder and the cubic boron nitride, with SiC supplemented therewith in an amount of from 1 to 20% by volume based on the total volume of cubic boron nitride and binding powder.

* * * * *

UNITED STATES PATENT AND TRADEMARK OFFICE
CERTIFICATE OF CORRECTION

PATENT NO. : 6,562,746 B2
DATED : May 13, 2003
INVENTOR(S) : Enya et al.

It is certified that error appears in the above-identified patent and that said Letters Patent is hereby corrected as shown below:

<u>Title page,</u>
Item [73], Assignee, should read:
-- [73] Assignees: Aisin Seiki Kabushiki Kaisha, Kariya (JP); National Institute of Advanced Industrial Science and Technology, Tokyo (JP); Tomei Diamond Co., Ltd., Oyama (JP) --

Signed and Sealed this

Twelfth Day of August, 2003

JAMES E. ROGAN
*Director of the United States Patent and Trademark Office*